(12) United States Patent
Uttormark

(10) Patent No.: US 12,353,331 B2
(45) Date of Patent: Jul. 8, 2025

(54) KERNEL MEMORY MONITOR FOR USER-SPACE MAPPING CHANGE NOTIFICATIONS

(71) Applicant: Hewlett Packard Enterprise Development LP, Spring, TX (US)

(72) Inventor: Michael J. Uttormark, Plymouth, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 108 days.

(21) Appl. No.: 18/496,699

(22) Filed: Oct. 27, 2023

(65) Prior Publication Data

US 2025/0110890 A1 Apr. 3, 2025

Related U.S. Application Data

(60) Provisional application No. 63/541,633, filed on Sep. 29, 2023.

(51) Int. Cl.
*G06F 12/10* (2016.01)
(52) U.S. Cl.
CPC .................................. *G06F 12/10* (2013.01)
(58) Field of Classification Search
None
See application file for complete search history.

(56) References Cited

U.S. PATENT DOCUMENTS

| | | | | |
|---|---|---|---|---|
| 9,684,601 B2* | 6/2017 | Böttcher | ............. | G06F 12/1054 |
| 11,216,385 B2* | 1/2022 | Park | .................... | G06F 12/1009 |
| 2005/0246506 A1* | 11/2005 | Ukai | .................... | G06F 9/3004 |
| | | | | 712/E9.032 |
| 2010/0191917 A1* | 7/2010 | Archer | ................ | G06F 12/0864 |
| | | | | 711/135 |
| 2024/0273193 A1* | 8/2024 | Avadhanam | .......... | G06F 21/552 |

* cited by examiner

*Primary Examiner* — Jared I Rutz
*Assistant Examiner* — Elias Young Kim
(74) *Attorney, Agent, or Firm* — Yao Legal Services, Inc.

(57) ABSTRACT

A system performs a registration process for monitoring a respective address range, by: receiving, from an application, a first command to monitor a first address range in a kernel; registering, in the kernel, the first address range; creating a monitoring state window in the kernel, the monitoring state window indicating that the first address range is valid; and providing, to the application, read-only access to the monitoring state window. The system detects, in the kernel based on a previous state of a mapping of virtual addresses to physical addresses, a change associated with a memory mapping of a second address range. The system updates the monitoring state window by invalidating address ranges overlapping with the second address range. Responsive to the first address range being valid, the system bypasses the registration process for the first address range.

17 Claims, 9 Drawing Sheets

KERNEL MEMORY MONITOR FOR USER-SPACE MAPPING CHANGE NOTIFICATIONS

RELATED APPLICATION

This application claims the benefit of U.S. Provisional Application No. 63/541,633, entitled "KERNEL MEMORY MONITOR FOR USER-SPACE MAPPING CHANGE NOTIFICATIONS," by inventor Michael J. Uttormark, filed 29 Sep. 2023.

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Field

Remote Direct Access Memory (RDMA) operations can be used to bypass normal memory protections to increase application performance, but RDMA operations require memory registration, which can incur computational expense. Current RDMA techniques allow operation on physical addresses mapped to virtual addresses used by an application, but underlying memory mapping changes may result in failure or data corruption.

BRIEF DESCRIPTION OF THE FIGURES

In the figures, like reference numerals refer to the same figure elements.

DETAILED DESCRIPTION

Figure 1:
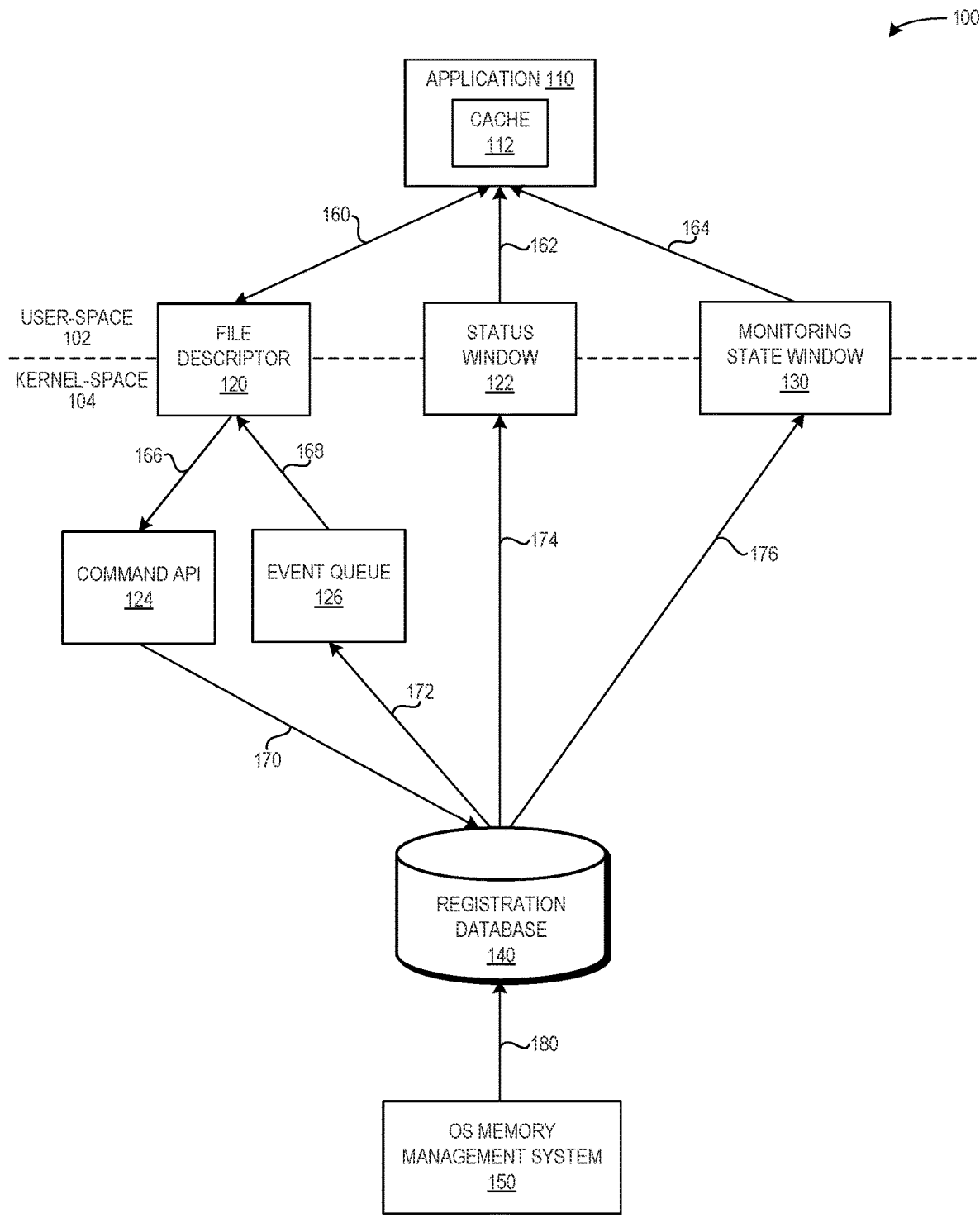
FIG. 1 illustrates an environment for facilitating a kernel memory monitor which provides mapping change notifications for a user-space, in accordance with an aspect of the present application.

Aspects of the instant application provide a system and method which facilitate a kernel memory monitor by placing a user-space cache between an application in user-space and memory registration in the kernel. The kernel can create a monitoring state window which is updated based on changes to memory mapping and accessible as a read-only data structure to the user-space. By using certain key identifying information (e.g., cookies and unique generation numbers) to track memory registrations, the application can check the status in the monitoring state window of a previously registered address range and based on the status, bypass subsequent memory registrations when re-using the previously registered address range. Bypassing the registration process can allow the same memory locations to be repeatedly used, which can eliminate expensive registration and deregistration processes and result in increased efficiency in the performance of RDMA operations.

As described above, using RDMA operations to directly transfer data can result in performance gains by user applications. In order for an application to use RDMA operations for direct data transfer, the application must "register" memory locations for the source and the destination of the RDMA operations. This registration process can be referred to as "memory registration." The application can operate on virtual addresses which are mapped to physical addresses. A network adapter can work inside an operating system (OS) and operate on the physical addresses. Subsequent to the memory registration process, the network adapter can directly transfer data into or out of these locations without using any intermediate buffers, i.e., by determining the corresponding physical addresses to use for the direct data transfers.

However, an application or an OS may perform an action which causes a change in the mapping of the virtual addresses to the physical addresses (i.e., a change in the "memory mapping"). For example, the application may cause the memory to become freed, or the OS may rearrange memory operations as part of performing a swapping operation. These actions may not be visible to the application and may be initiated by an intermediate library or subsystem. Regardless of the initiating entity or the reason for the change in the memory mapping, these actions may result in inaccurate memory registration, which in turn may result in the failure of future data transfers, data corruption, or other errors. For example, if the memory location being read from has changed, incorrect data may be returned, which can cause issues with a requesting application. Similarly, if the memory location being written to has changed, inaccurate or incorrect data may be written to the wrong location, which can cause issues with other applications which rely on the data stored in that memory location.

One technique to address these challenges is to implement a memory monitor. A memory monitor can detect memory mapping changes and deregister the appropriate memory ranges from memory registration components of a system. In one technique, a user-space solution allows an application to access memory allocation and de-allocation functions, including the memory-freeing functions. This user-space solution can track whether an application is using an address and whether the application has freed that address. However, this user-space solution lacks access to all functions which can change the underlying memory mapping. As a result, this user-space solution may miss certain triggering events, such as stack allocations which are controlled by the operating system and may not be overridden by the application.

Another technique provides a facility in a Linux kernel which can aid in migration of a virtual machine from a first host to a second host. During a background copy of data from the first host to the second host, if a fault occurs, the kernel can notify a memory cache of the fault in order to clear the memory cache. However, the monitoring thread for the memory cache resides in the user-space and may be subject to scheduling like other threads. As a result, this notification cannot be performed in real-time (i.e., not performed synchronously with the underlying mapping change). These asynchronous notifications can also result in inaccurate memory registration.

In another technique, a memory monitor can mark a global flag to indicate that a memory mapping for any monitored address or address range has changed. To determine whether a specific memory mapping has changed, the memory registration cache can check the global flag. If the global flag is set, an application can stop all pending actions or threads, read from a file descriptor to obtain the changed events (i.e., all changed memory mappings), modify the memory registration cache based on the information read from the file descriptor, and resume the pending actions or threads. However, in this technique, the application must perform several steps, including locking all active threads, in order to obtain the memory change and update the cache. These steps, especially in a multi-threaded environment, can degrade the performance of the memory monitor and, consequently, the overall system.

The described aspects of the instant application address these limitations by providing a system which: monitors all memory mapping address changes in the kernel (instead of only in the user-space); provides synchronous notification of the memory mapping changes to the application (instead of asynchronous notifications); and implements a per-registration notification for the cache to determine a specific memory mapping change (instead of a global flag which requires reading all memory mapping changes from a file descriptor to determine a specific memory mapping change).

The described aspects of the system can perform a registration process which updates a registration database and a monitoring state window in the kernel and can further return certain identifying information to the cache. The system can utilize mapping change notifications from the kernel to update both the registration database and the monitoring state window. The application can access the monitoring state window as a read-only data structure and determine, based on the cache, whether the registration process may be bypassed when using a certain address range.

Environment for Facilitating a Kernel Memory Monitor which Provides Mapping Change Notifications for a User-Space FIG. 1 illustrates an environment 100 for facilitating a kernel memory monitor which provides mapping change notifications for a user-space, in accordance with an aspect of the present application. Environment 100 can include a user-space 102 and a kernel-space 104. Kernel-space 104 may include a memory area for running the operating system kernel, kernel extension, and some device drivers, while user-space 102 may include a memory area for running applications or other code outside the kernel of the operating system. Environment 100 can represent a computing node or entity, such as a server, a computer system, or other computing device which includes a user-space and a kernel-space. Environment 100 can include, in user-space 102, an application 110 with a cache 112. Cache 112 can be a memory registration cache which is implemented by a transport library (e.g., Libfabric, Open Fabric Interface (OFI), or any other transport library). Environment 100 can also include, in kernel-space 104: a file descriptor 120 which can be a process-unique identifier for a file or other input/output (I/O) resource; a status window 122; a monitoring state window 130; a command application programming interface (API) 124; an event queue 126 to which events may be posted when addresses are invalidated in the monitoring state window; a registration database 140; and an operating system (OS) memory management system 150. Application 110 may have read and write access to file descriptor 120 and status window 122. Application 110 may have read-only access to monitoring state window 130. Application 110, cache 112, monitoring state window 130, registration database 140, and OS memory management system 150 are described in detail below in relation to, respectively, application 210, cache 212, monitoring state window 260, registration database 240, and OS memory management system 280 of FIG. 2.

Initializing the Kernel Memory Monitor

During setup or initialization of the kernel memory monitor, application 110 can issue a command to initialize the memory registration process, e.g., by using a library and making an input/output control (ioctl( )) system call to file descriptor 120 (via 160). The command can indicate a maximum size of registration database 140. The command can result in setting up status window 122 and registration database 140 (based on the indicated size) and creating a new instance of monitoring state window 130. In addition, the system can initialize the memory allocation routines of an OS memory management system (or subsystem) of the kernel.

Performing the Registration Process

After initializing the kernel memory monitor, application 110 may determine to use an address range for, e.g., an input/output (I/O) command. Application 110 can register the address range by issuing a command to register the address range for monitoring (via 160). File descriptor 120 can send the command to command API 124 (via 166). Command API 124 can send the pertinent information (such as the memory range to monitored) to registration database 140 (via 170). Upon receiving the information, registration database 140 can create an entry with identifying information, as described below in relation to FIG. 2. Registration database 140 can also send to status window 122 (via 174) statistics relating to, e.g., a number of active registrations, a number of invalidations processed, and information related to occupancy of event queue 126. Application 110 can view the statistics provided to status window 122 (via 162), e.g., on a display screen (not shown) of a device associated with application 110. Furthermore, registration database 140 can allocate and set as valid an element in monitoring state window 130 (via 176) by sending information related to the address range registered for monitoring, as described below in relation to FIG. 2. Application 110 can use the information in monitoring state window 130 (via 164) to determine whether a particular address range is valid. Upon determining that a particular address range is valid, application 110 can bypass the memory registration process for a subsequent I/O command involving the particular address range.

Processing a Memory Mapping Change Notification

Memory management system 150 can manage and detect memory mapping changes and can be based on, e.g., a Linux kernel. Upon detecting a memory mapping change, memory management system 150 can send a notification message (e.g., a Linux memory management unit (mmu) call or an "mmu_notifier" message) to registration database 140 (via 180). The notification message can indicate that an underlying memory mapping has changed, i.e., that a mapping of a virtual address to a physical address has changed for a particular address range. The mmu_notifier call is used in this disclosure as a non-limiting example of a Linux-specific kernel mechanism which provides information about memory mapping changes. Other mechanisms, including other entities or components, may be used to provide information about memory mapping changes while prohibiting the user-space from changing the memory mapping. The system can identify in registration database 140 entries with address ranges which overlap with the particular changed address range. The system can identify and set as invalid the corresponding elements in monitoring state window 130, and can further remove the entries from registration database 140. The system can also send an indication of the invalidation(s) to event queue 126 (via 172), which can be sent back to file descriptor 120 (via 168) and eventually displayed as a statistic in status window 122 (via 174).

Figure 2:
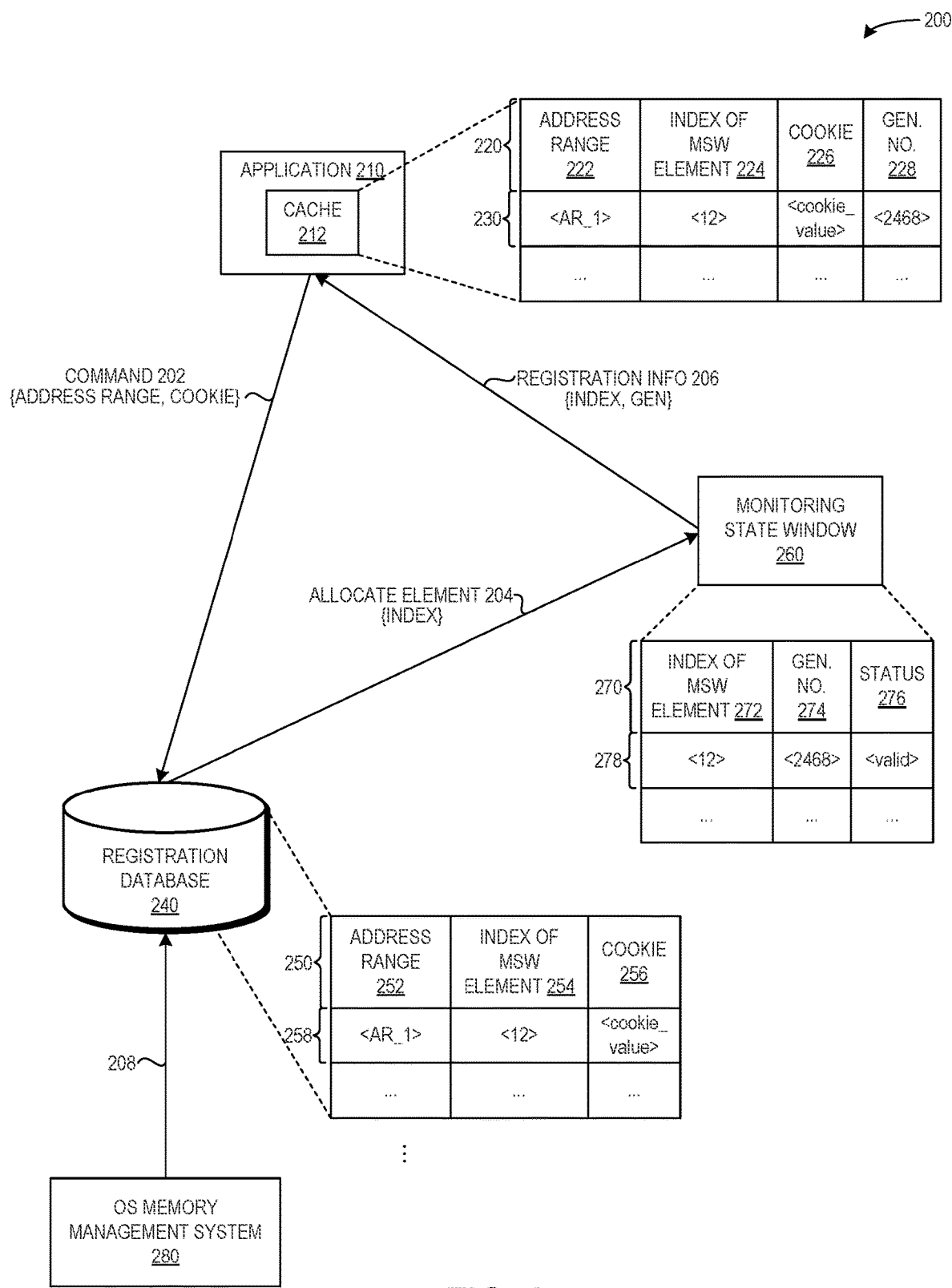
FIG. 2 illustrates an environment for facilitating a kernel memory monitor which provides mapping change notifications for a user-space, including data structures which are updated based on registration and mapping change notifications, in accordance with an aspect of the present application.

In addition to processing a memory mapping change notification, aspects of the described system can bypass registration for valid address ranges and deregister previously registered address ranges, as described below in relation to FIG. 2.

Updating Data Structures Based on Memory Registration and Memory Mapping Change Notifications; Bypassing Registration; Deregistration FIG. 2 illustrates an environment 200 for facilitating a kernel memory monitor which provides mapping change notifications for a user-space, including data structures which are updated based on registration and mapping change notifications, in accordance with an aspect of the present application. Environment 200 can include: an application 210 with a cache 212 (in a user-space); a monitoring state window 260 (in a kernel-space and accessible as a read-only data structure to application 210); a registration database 240 (in the kernel-space); and an operating system (OS) memory management system 280. The entities depicted in environment 200 can be similar to the ones depicted in environment 100. For illustration purposes, only certain entities from environment 100 are included in environment 200, e.g.: application 210 can correspond to application 110; registration database 240 can correspond to registration database 140; monitoring state window 260 can correspond to monitoring state window 130; and OS memory management system 280 can correspond to OS memory management system 150.

Performing the Registration Process

Assuming that the kernel memory monitor has been initialized in environment 200, application 210 may determine to use a first address range for an I/O operation. Application 210 can perform the registration process for the first address range by issuing a command 202 to registration database 240. Command 202 can include the first address range and a cookie generated by application 210 as an identifier for command 202. The transport library which implements cache 212 can use, e.g., a 64-bit atomic counter to generate unique cookies across all threads in application 210 or any other manner of generating unique identifiers across all threads in application 210. The cookie (or other unique identifier) can be a small block of data or a small file, which can include a string of characters (e.g., a 64-bit value or other unique generated identifier). Application 210 can use the cookie (or other unique identifier) when subsequently searching registration database 240 to determine if an entry for a particular memory range still exists.

Application 210 can track the memory registration requested in command 202 by storing information in cache 212. Cache 212 can include entries with various information, as indicated by a row 220 of columns, including: an address range 222; an index of the corresponding monitoring state window (MSW) element 224; a cookie 226; and a generation number 228. Prior to completion of the registration process, only the address range (222) and cookie (226) fields may be known. Subsequent to completion of the registration process, the index (224) and generation number (228) fields can be updated, as described below. For example, prior to completion of the registration process, a cache entry 230 corresponding to command 202 can include: an address range with a value of "AR_1" (such as 0-99); and a cookie with a value of "cookie_value" (e.g., a 64-bit value or any other unique generated identifier).

Upon receiving command 202, registration database 240 can create an entry which stores the first address range, the cookie, and an index of a slot or an element to be allocated in monitoring state window 260. In registration database 240, a row 250 can indicate columns or information for entries in registration database 240, including: an address range 252; an index of a corresponding monitoring state window (MSW) element 254; and a cookie 256. For example, an entry 258 corresponding to command 202 can include: an address range with a value of "AR_1" (such as 0-99); an index of MSW element with a value of "12"; and a cookie with a value of "cookie_value" (e.g., a 64-bit value or any other unique generated identifier).

The system can allocate and set as valid the element in monitoring state window 260 (via 204) based on the index of the monitoring state window element. In monitoring state window 260, a row 270 can indicate fields for elements in monitoring state window 260, including: an index of MSW element 272; a unique generation number 274; and a status 276. For example, an element 278 can include: an index of MSW element with a value of "12"; a generation number with a value of "2468"; and a status set to "valid."

Generation number 274 can be a unique number generated for the specific element, such as a fixed size number which is incremented by one for each subsequent generation. Generation number 274 can be used to indicate to application 210 whether an entry with the address range and the same generation number is still valid, which can allow application 210 to bypass the memory registration process for the address range.

The system can return registration information 206 (including the MSW index and the generation number for the corresponding address range of command 202) to application 210. Application 210 can update cache entry 230 to include: an index of MSW element with a value of "12"; and a generation number with a value of "2468."

Processing a Memory Mapping Change Notification

During operation, OS memory management system 280 may detect or determine an underlying memory mapping change for a particular address range. MMS 280 can send to registration database 240 a notification indicating the particular changed address range, e.g., in the form of a Linux mmu_notifier call (via 208).

The system can search for and identify in registration database 240 all entries for address ranges which overlap the particular changed address range. The system can update monitoring state window 260 by changing the elements in monitoring state window 260 which correspond to the identified entries (based on the index numbers). Specifically, for the corresponding elements in monitoring state window 260, the system can change or set the respective status to invalid. During this time, the kernel memory monitor can hold a lock which prevents any thread in application 210 from modifying the memory while the status of elements in monitoring state window 260 is being changed. As a result, monitoring state window 260 can serve as a synchronous interface to memory mapping changes. The system can remove the identified entries from registration database 240. The system can also issue an event (or an indication of the invalidation(s)) to an event queue (e.g., 126 via 172 in FIG. 1), which can be eventually be displayed as a statistic in a status window (e.g., 122 via 174 in FIG. 1). The system can free the identified elements monitoring state window 260 and provide updated statistics in the status window.

Bypassing Registration for Valid Address Ranges

After registering the first address range, application 210 may determine at a subsequent time to use the same address range, e.g., for another I/O command. Application 210 can bypass the registration process for the first address range if a check of the element in monitoring state window 260 indicates that the first address range is still valid. Specifically, application 210 can use the index and the generation number in cache entry 230 to obtain element 278 which corresponds to the index. If a comparison of the generation number in cache entry 230 with the generation number in the obtained element 278 results in a match, this indicates that the element is still allocated to the first address range and has not been re-allocated to a different address range. Furthermore, if the status of the obtained element is set to the valid state, application 210 can bypass the registration process for the first address range. Bypassing the registration process can allow the same memory locations to be repeatedly used, which can eliminate expensive registration and deregistration processes and enhance the performance of RDMA operations.

However, if the generation numbers do not match or the status of the obtained element is set to the invalid state, this indicates that the slot has been re-allocated or invalidated. In either case, application 210 cannot bypass the registration process for the first address range, and instead, must perform the registration process for the first address range.

Deregistering Previously Registered Address Ranges

Application 210 may determine to deregister a previously registered address range. Cache 212 may store an entry for the previously registered address range, and the cache entry can include a cookie ("cache entry cookie"). Application 210 can send a command 202 indicating the address range and the cache entry cookie. If the cache entry cookie is the same as the cookie in the entry for the indicated address range in registration database 240 ("registration database cookie"), this indicates that the registration database entry corresponds to the correct previously registered address range and the system can remove the entry from registration database 240. However, if the cache entry cookie does not match the registration database cookie, this indicates that the registration database entry for the indicated address range corresponds to a different memory registration and thus will not be removed from registration database 240.

Figure 3:
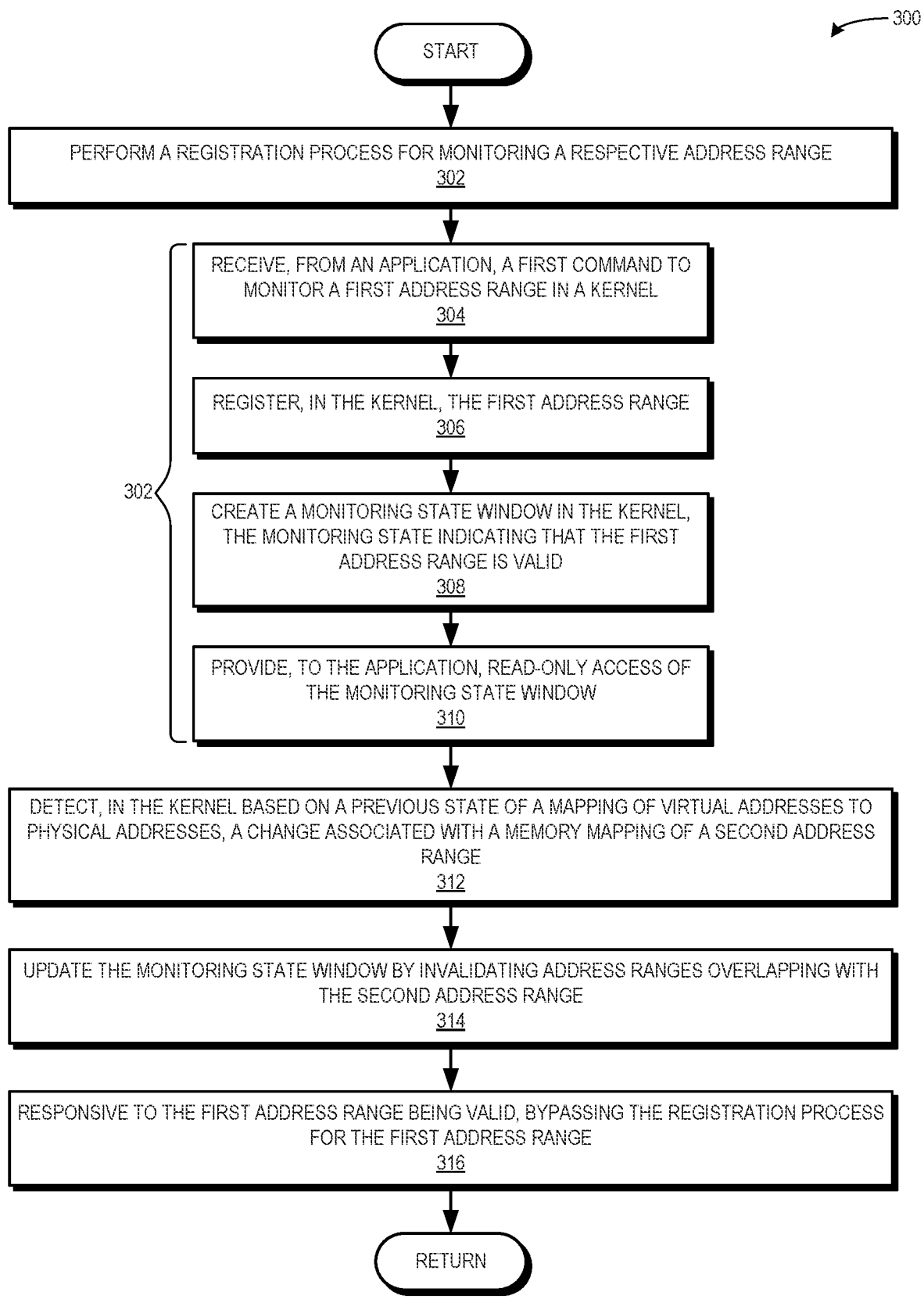
FIG. 3 presents a flowchart illustrating a method for facilitating a kernel memory monitor which provides mapping change notifications for a user-space, in accordance with an aspect of the present application.

Method for Facilitating a Kernel Memory Monitor which Provides Mapping Change Notifications for a User-Space FIG. 3 presents a flowchart 300 illustrating a method for facilitating a kernel memory monitor which provides mapping change notifications for a user-space, in accordance with an aspect of the present application. During operation, the system performs a registration process for monitoring a respective address range (operation 302). Performing the registration process (302) includes the following operations 304-310. The system receives, from an application, a first command to monitor a first address range in a kernel (operation 304). The command (160 or 202) can originate from an application (110 or 210) in a user-space and be sent to a file-descriptor in a kernel-space based on a transport library call. The transport library can implement a memory registration cache (112 and 212) of the application. The command can include the first address range and a cookie generated by the application. The system registers, in the kernel, the first address range (operation 306). The registration can include creating an entry in a registration database (140 or 240), and the entry can include the address range, an index of an element to be allocated in a monitoring state window, and the cookie.

The system creates a monitoring state window (130 or 260) in the kernel, the monitoring state window indicating that the first address range is valid (operation 308). The monitoring state window can be an array or other data structure which is accessible as read-only data by the user-space application and cache. Elements in the monitoring state window can indicate the index of a respective element, a generation number unique to the respective element, and a status or state (e.g., valid or invalid) of an address range represented by the respective element. The system provides to the application, read-only access to the monitoring state window (operation 310).

The system detects, in the kernel based on a previous state of a mapping of virtual addresses to physical addresses, a change associated with a memory mapping of a second address range (operation 312). A memory management system or subsystem (150 or 280) of the kernel can detect the change and provide a notification (180 or 208) of the memory mapping change, e.g., via a Linux mmu_notifier call. The system updates the monitoring state window (130 or 260) by invalidating address ranges overlapping with the second address range (operation 314). The system can search registration database 240 for entries which indicate the address ranges overlapping with the second address range. The search can be based on an optimized or tree-based search algorithm (e.g., a Red-Black tree based on a self-balancing binary search tree).

Responsive to the first address range being valid, the system bypasses the registration process for the first address range (operation 316). The system (or an application) can bypass the registration process for a given address range if a check of the element in the monitoring state window indicates that the given address range is still valid, as described above in relation to FIG. 2. The operation returns.

Figure 4A:
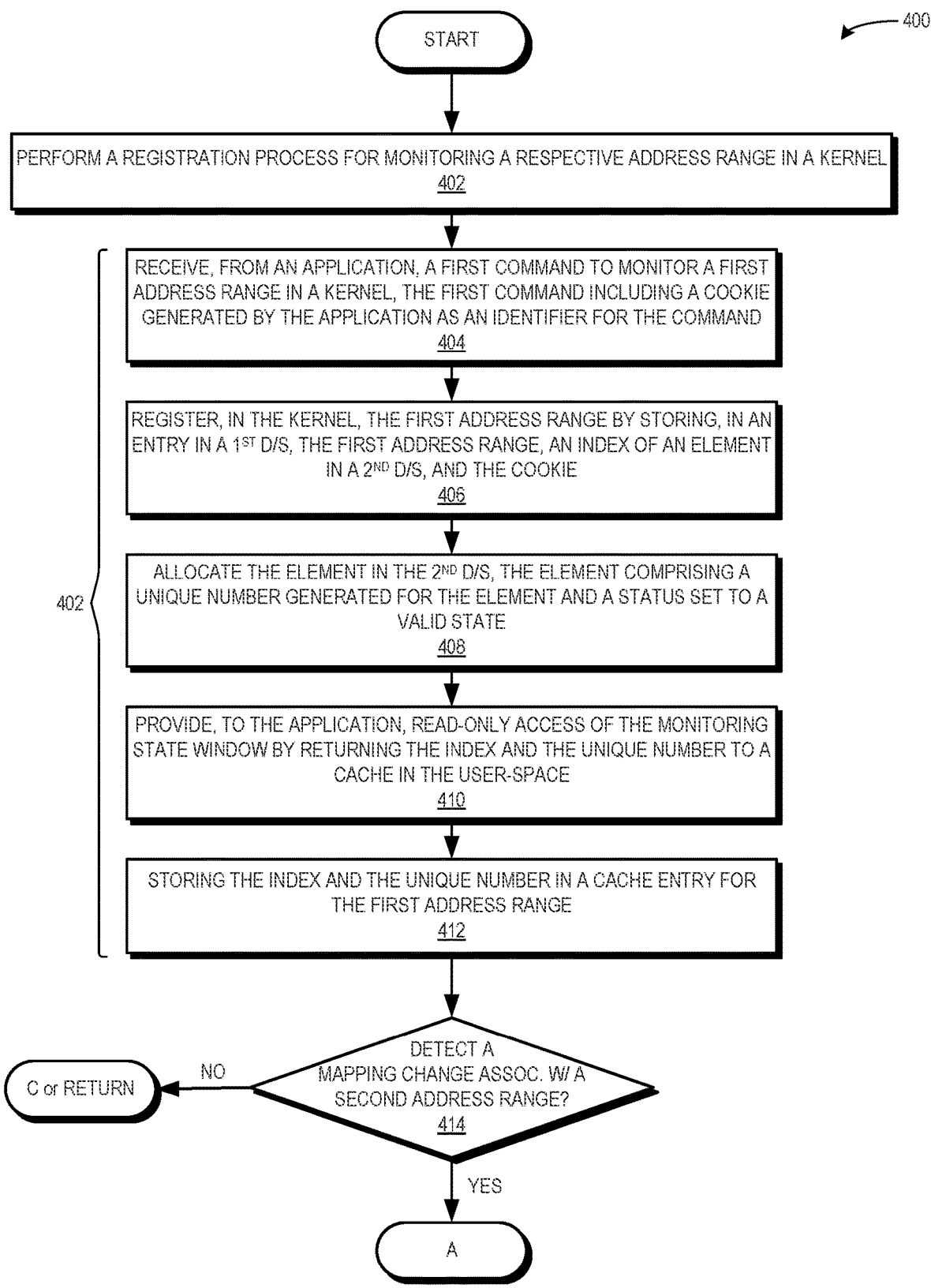
FIG. 4A presents a flowchart illustrating a method for facilitating a kernel memory monitor which provides mapping change notifications for a user-space, including performing a registration process, in accordance with an aspect of the present application.

FIG. 4A presents a flowchart 400 illustrating a method for facilitating a kernel memory monitor which provides mapping change notifications for a user-space, including performing a registration process, in accordance with an aspect of the present application. During operation, the system performs a registration process for monitoring a respective address range in a kernel (operation 402). Performing the registration process (402) includes the following operations 404-412. The system receives, from an application in a user-space, a first command to monitor a first address range in a kernel, the first command including a cookie generated by the application as an identifier for the command (operation 404, similar to operation 304). The command can originate from a user-space application, and the application can maintain a memory registration cache implemented by a transport library. The command can include the first address range and the cookie generated by the application. The application can subsequently use the cookie when deregistering a previously registered memory range, e.g., by sending a command with the cookie associated with the previously registered memory range and deregistering the memory range based on the cookies matching. Matching cookies can indicate a confirmation that the entry for the previously registered memory range exists and thus can be removed, as described below in relation to FIG. 5.

The system registers, in the kernel, the first address range by storing, in an entry in the first data structure, the first address range, an index of element in a second data structure, and the cookie (operation 406, similar to operation 306). The first data structure can be a registration database (140 or 240), and the entry can correspond to, e.g., entry 258 of FIG. 2. The index of the element can be the index of a slot to be allocated in the monitoring state window array.

The system allocates the element in the second data structure based on the index stored in the corresponding registration database entry, the element comprising a unique number generated for the element and a status set to a valid state (operation 408). The second data structure can be a monitoring state window (130 or 260) or an array which is accessible as a read-only data structure by the application. The generation number can be a number generated by the monitoring state window, e.g., a fixed size number which is incremented by 1 each time a new generation number is generated. Elements in the monitoring state window (e.g., element 278 of FIG. 2) can indicate the index, the generation number, and the status (e.g., valid or invalid). The application can use the generation number in subsequent attempts to re-use the memory location, e.g., in order to determine whether the application may bypass the registration process.

The system provides, to the application, read-only access to the monitoring state window by returning the index and the unique number to a cache (112 or 212) in the user-space (operation 410). The system stores the index and the unique number in a cache entry for the first address range (operation 412), resulting in a cache entry which includes the first address range, the corresponding index in the monitoring state window, the cookie, and the generation number (e.g., entry 238). The application can subsequently use the generation number when determining whether to bypass the registration process for a particular address range, and the application can subsequently use the cookie to determine if an entry for the corresponding memory range still exists in the registration database.

Figure 4B:
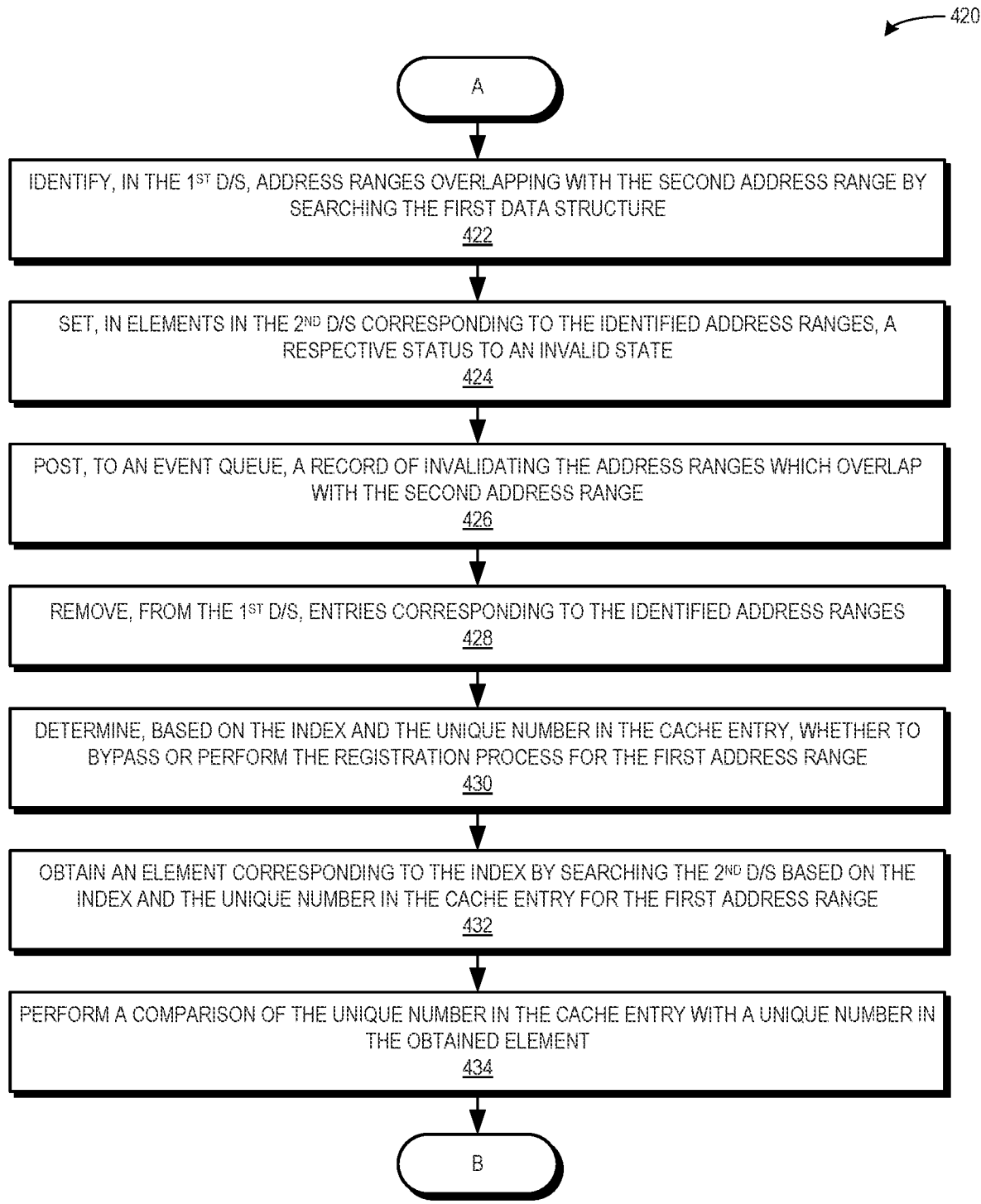
FIG. 4B presents a flowchart illustrating a method for facilitating a kernel memory monitor which provides mapping change notifications for a user-space, including actions in response to detecting a mapping change, in accordance with an aspect of the present application.

If the system detects a mapping change associated with a second address range (decision 414), the operation continues at Label A of FIG. 4B. The change may be based on a change associated with a mapping of a virtual address to physical addresses monitored by the kernel. The change may be detected based on a notification sent by an OS memory management subsystem of the kernel, e.g., a Linux kernel OS MMS sending a notification such as an mmu_notifier call. If the system does not detect a mapping change associated with a second address range (decision 414), the operation continues at Label C of FIG. 5 or returns.

FIG. 4B presents a flowchart 420 illustrating a method for facilitating a kernel memory monitor which provides mapping change notifications for a user-space, including actions in response to detecting a mapping change, in accordance with an aspect of the present application. The system identifies, in the first data structure, address ranges overlapping with the second address range by searching the first data structure (operation 422). The system can identify the overlapping address ranges based on an optimized search of the registration database (140 or 240). The system sets, in elements in the second data structure corresponding to the identified address ranges, a respective status to an invalid state (operation 424). Similar to operation 314, the system can update the monitoring state window (130 or 260) by invalidating the identified overlapping address ranges. The system posts, to an event queue (126), a record of invalidating the address ranges which overlap with the second address range (operation 426). In some aspects, the system posts to the event queue only when addresses are invalidated in the monitoring state window, e.g., based on detecting the memory mapping change and receiving the mmu_notifier notification message from the kernel memory management system (150 or 280). The system removes, from the first data structure, entries corresponding to the identified address ranges (operation 428). The system can delete the corresponding entries or insert a null value or other predetermined default value for the cookie. The null or default value can indicate to the application that the entry for the address range no longer exists.

The application may determine whether it can re-use an address range that was previously registered, e.g., whether it can re-use the memory locations specified by the first address range for a subsequent I/O command. The system determines, based on the index and the unique number in the cache entry, whether to bypass or perform the registration process for the first address range (operation 430). The application can bypass the registration process for a given address range if a check of the element in the monitoring state window indicates that the given address range is still valid, as described above in relation to FIG. 2.

The system obtains an element corresponding to the index by searching the second data structure based on the index and the unique number in the cache entry for the first address range (operation 432). The system can search the monitoring state window for an element (278) with a corresponding index as in the cache entry (230) for the first address range. The system performs a comparison of the unique number in the cache entry with a unique number in the obtained element (operation 434). The system can use the generation number to make a decision on whether to bypass or perform the registration process. The operation continues at Label B of FIG. 4C.

Figure 4C:
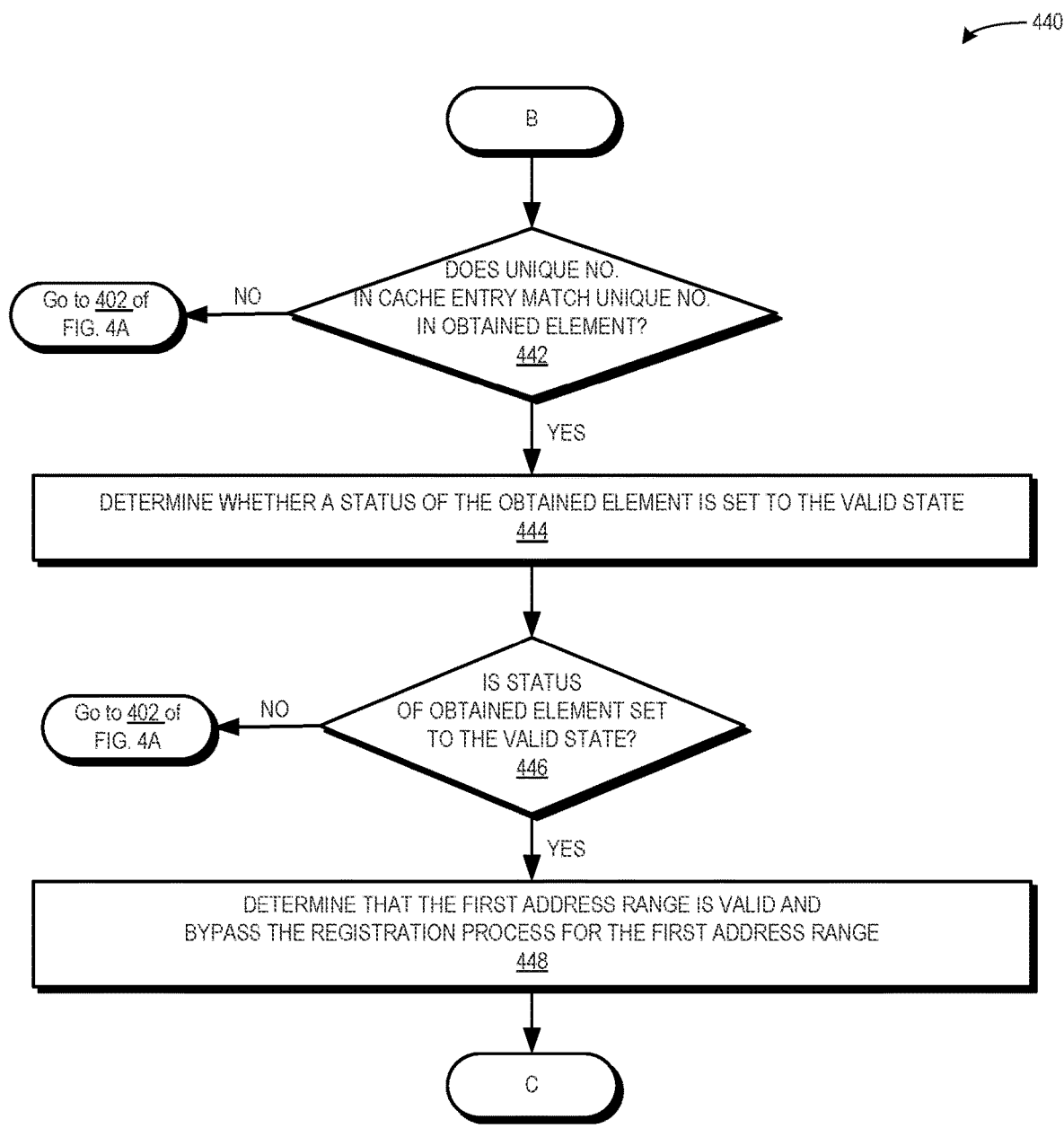
FIG. 4C presents a flowchart illustrating a method for facilitating a kernel memory monitor which provides mapping change notifications for a user-space, including conditions for bypassing the registration process, in accordance with an aspect of the present application.

FIG. 4C presents a flowchart 440 illustrating a method for facilitating a kernel memory monitor which provides mapping change notifications for a user-space, including conditions for bypassing the registration process, in accordance with an aspect of the present application. If the system determines, based on the comparison, that the unique number in the cache entry does not match the unique number in the obtained element (decision 442), the operation continues at operation 402 of FIG. 4A, i.e., the system must perform the memory registration process again for the first address range. The system cannot bypass the memory registration process because the non-matching generation numbers (e.g., in cache entry 230 and element 278) indicate that the element has been re-allocated to a different address range and is no longer allocated to the previously registered address range corresponding to the unique number in the cache entry.

If the system determines, based on the comparison, that the unique number in the cache entry does match the unique number in the obtained element (decision 442) (e.g., matching generation numbers in cache entry 230 and element 278), the system determines whether a status of the obtained element is set to the valid state (operation 444). If the status of the obtained element is not set to the valid state (decision 446), the operation continues at operation 402 of FIG. 4A, i.e., the system determines that the first address range indicated in cache entry 230 is invalid based on the status of corresponding element 278 and thus must perform the memory registration process again for the first address range. The system cannot bypass the memory registration process because the first address range is no longer valid, e.g., may have been set to an invalid state due to an underlying mapping change associated with the first address range or a deregistration process for the first address range.

If the status of the obtained element is set to the valid state (decision 446), the system determines that the first address range is valid and bypasses the registration process for the first address range (operation 448, similar to operation 316). The operation continues at Label C of FIG. 5. Thus, both of the conditions represented by decision 442 (matching generation numbers) and 446 (address range indicates a valid status) must be true in order for the application to bypass the memory registration process.

Figure 5:
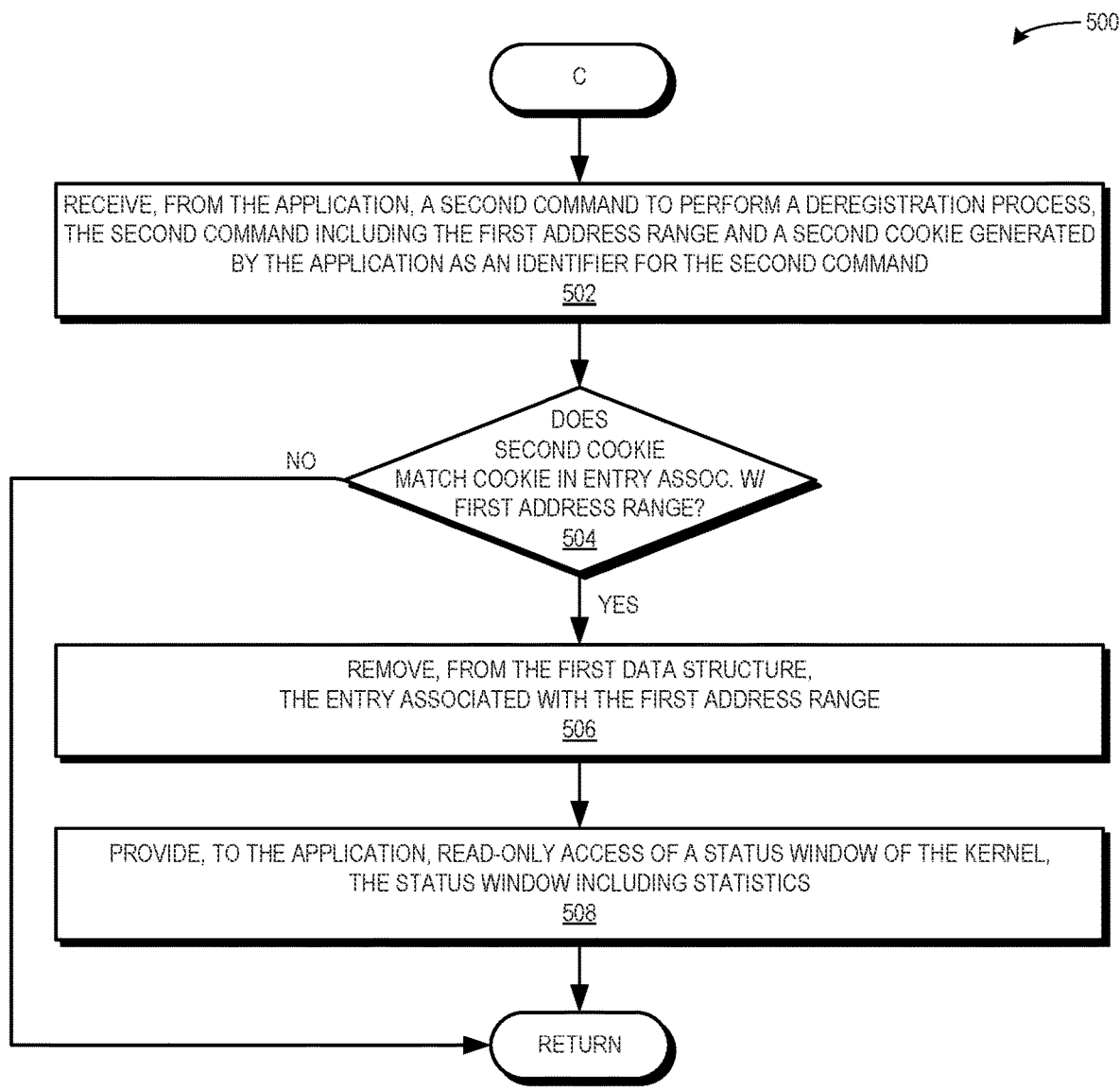
FIG. 5 presents a flowchart illustrating a method for facilitating a kernel memory monitor which provides mapping change notifications for a user-space, including performing a deregistration process, in accordance with an aspect of the present application.

FIG. 5 presents a flowchart 500 illustrating a method for facilitating a kernel memory monitor which provides mapping change notifications for a user-space, including performing a deregistration process, in accordance with an aspect of the present application. The system receives, from the application, a second command to perform a deregistration process, the second command including the first address range and a second cookie generated by the application as an identifier for the second command (operation 502). The application can use the second cookie when searching the registration database (140 or 240) to determine whether an entry for the first address still exists, i.e., in order for the kernel to remove that entry from the registration database. If the second cookie does not match the cookie in the registration database entry associated with the first address range (decision 504), the operation returns. In some aspects, the operation can return an error message to be displayed on the status window for the user, e.g., as part of a displayed statistic or as an individual error message.

If the second cookie does match the cookie in the registration database entry associated with the first address range (decision 504), the system removes, from the first data structure, the entry associated with the first address range (operation 506). The system can delete the entry with the first address range or insert a null value or other predetermined default value for the cookie. The null or default value can indicate to the application that the entry for the first address range no longer exists. The system provides, to the application, read-only access to a status window of the kernel, the status window including statistics (operation 508). The statistic can relate to at least one of: a number of active registrations; a number of invalidations processed; or information related to occupancy of an event queue. The operation returns.

Figure 6:
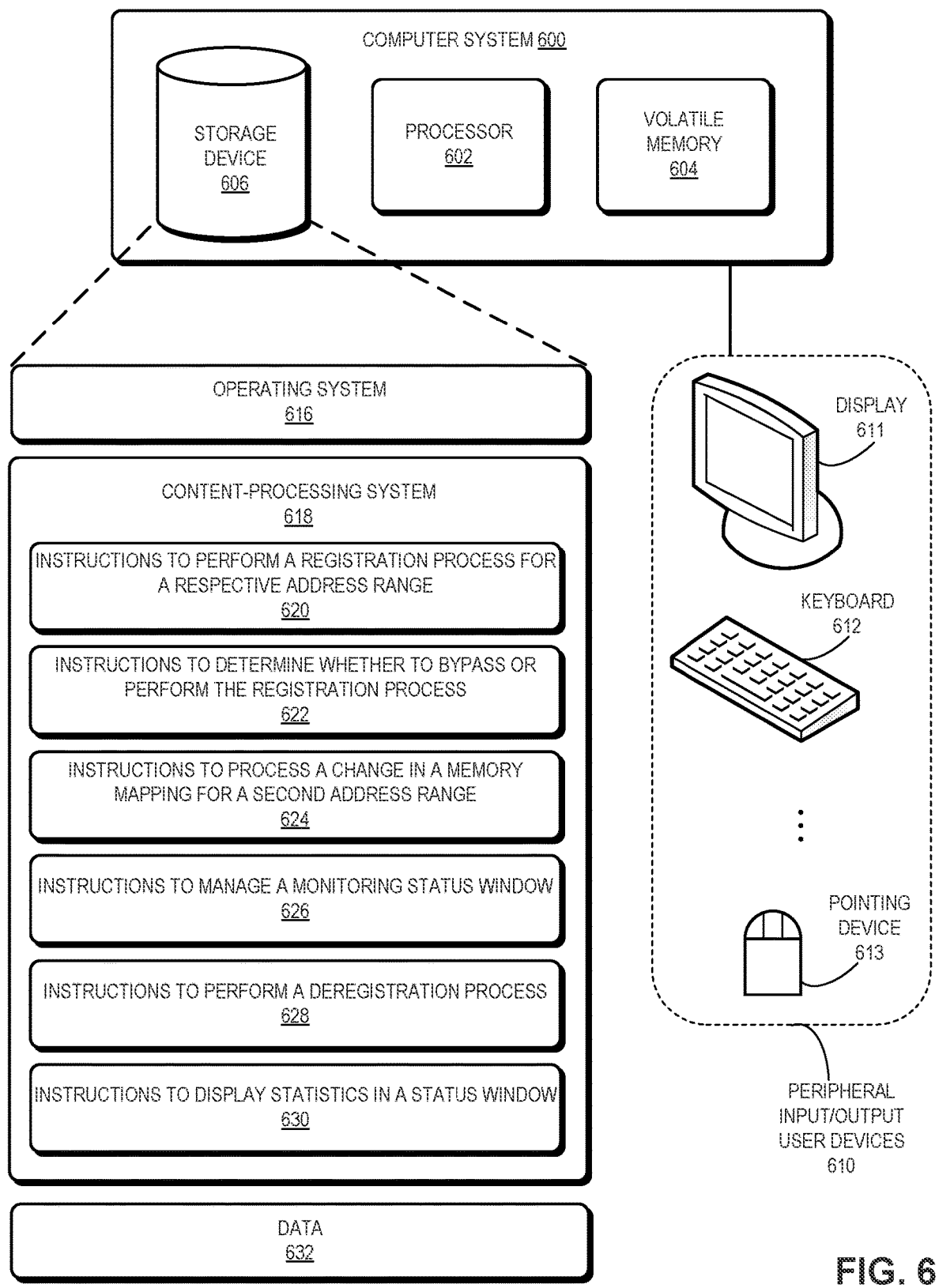
FIG. 6 illustrates a computer system for facilitating a kernel memory monitor which provides mapping change notifications for a user-space, in accordance with an aspect of the present application.

Computer System for Facilitating a Kernel Memory Monitor which Provides Mapping Change Notifications for a User-Space FIG. 6 illustrates a computer system 600 for facilitating a kernel memory monitor which provides mapping change notifications for a user-space, in accordance with an aspect of the present application. Computer system 600 includes a processor 602, a memory 604, and a storage device 606. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Storage device 606 includes non-transitory computer-readable storage medium and stores an operating system 616, a content-processing system 618, and data 632. Computer system 600 may include fewer or more entities or instructions than those shown in FIG. 6.

Content-processing system 618 can include instructions, which when executed by computer system 600, can cause computer system 600 to perform methods and/or processes described in this disclosure. Specifically, content-processing system 618 may include instructions 620 to perform a registration process for a respective address range, e.g.: registering, in a registration database of the kernel, the first address range in response to a request from an application; and indicating that the first address range is valid in a monitoring state window which is a read-only data structure for the application. Instructions 620 can also include the operations associated with performing the registration process, as described above in relation to FIGS. 3 and 4A, e.g., operations 302-310 and 402-412.

Content-processing system 618 can include instructions 622 to determine whether to bypass or perform the registration process, e.g.: determining, based on a command to re-use the first address range, whether to bypass the registration process for the first address range; and bypassing the registration process for the first address range in response to the first address range being valid in the monitoring state window. Instructions 622 can also include operations as described above in relation to FIGS. 4B and 4C, e.g., operations 430, 432, 434, 442, 444, 446, and 448.

Content-processing system 618 can include instructions 624 to process a change in a memory mapping for a second address range, e.g.: receiving a notification of a change in a virtual-to-physical memory mapping associated with a second address range; and invalidating, in the monitoring state window, address ranges overlapping with the second address range. Instructions 624 can also include operations as described in relation to FIGS. 4A and 4B, e.g., operations 414 and 422-428.

Content-processing system 618 can include instructions 626 to manage a monitoring status window in the kernel, e.g.: updating the monitoring state window by setting, in identified elements, a status to an invalid state. Instructions 626 can also include operations as described in relation to monitoring state windows 130 and 260 of, respectively, FIGS. 1 and 2.

Content-processing system 618 can include instructions 628 to perform a deregistration process, including operations as described above in relation to FIG. 5, e.g., operations 502-506. Content-processing system 618 can further include instructions 630 to display statistics in a status window, including operations as described above in relation to FIG. 5, e.g., operation 508.

Data 632 can include any data that is required as input or that is generated as output by the methods, operations, communications, and/or processes described in this disclosure. Specifically, data 632 can store at least: a command; a physical address; a virtual address; an address range; a mapping of a virtual address or address range to a physical address or address range; a cookie; a first data structure; a registration database; a second data structure; a monitoring state window; an index of the monitoring state window; an entry indicating an address range, a cookie, and an index of the monitoring state window; an element; an array; an element indicating an index, a unique generation number, and a status; a notification of a memory mapping change; a record of an invalidated address range; a result of a comparison between two cookies or two generation numbers; statistics; a status window; a number of active registrations; a number of invalidations processed; and information related to occupancy of an event queue.

Figure 7:
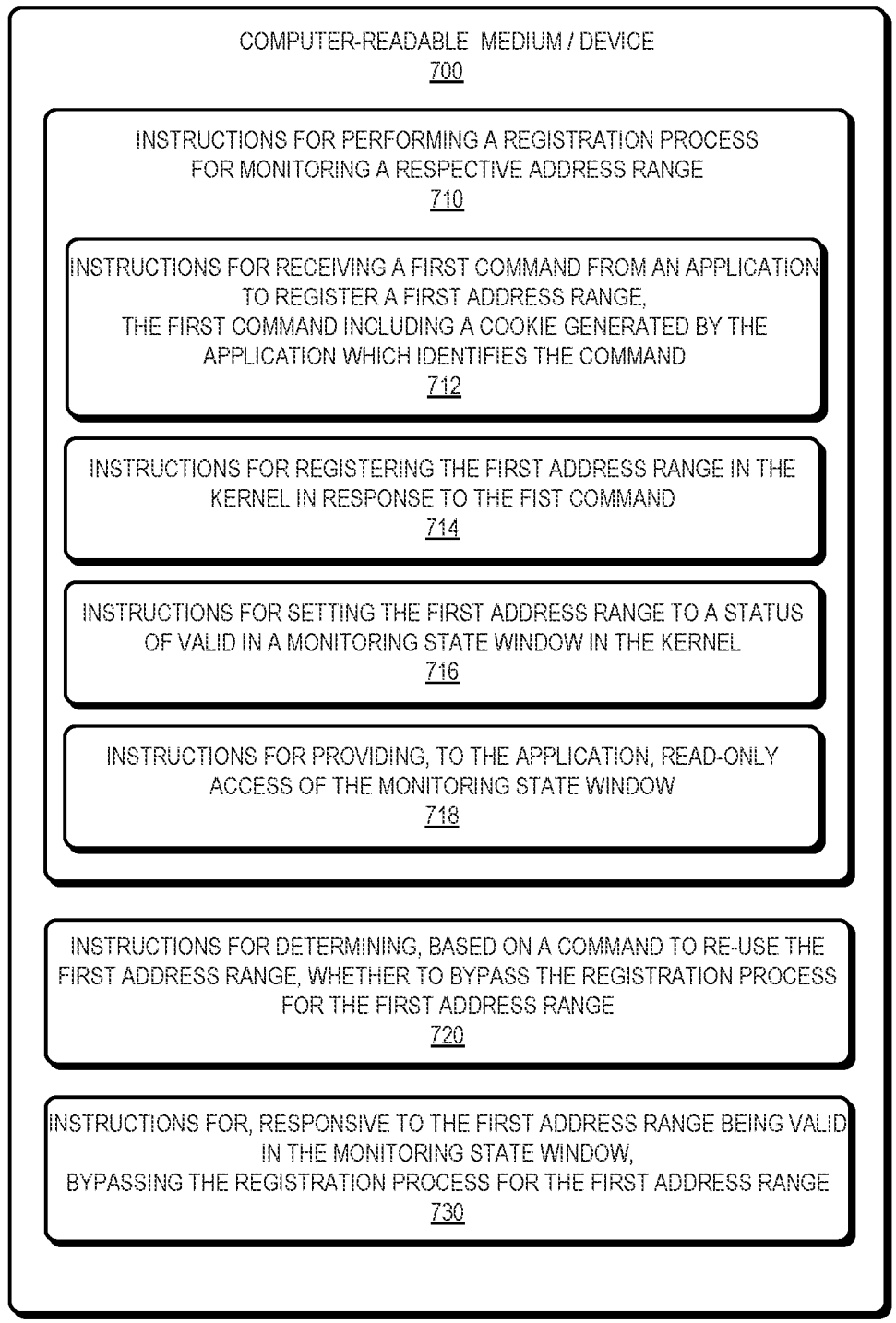
FIG. 7 illustrates a non-transitory computer-readable medium for facilitating a kernel memory monitor which provides mapping change notifications for a user-space, in accordance with an aspect of the present application.

Non-Transitory Computer-Readable Device for Facilitating a Kernel Memory Monitor which Provides Mapping Change Notifications for a User-Space FIG. 7 illustrates a non-transitory computer-readable device 700 for facilitating a kernel memory monitor which provides mapping change notifications for a user-space, in accordance with an aspect of the present application. Device 700 can be a non-transitory computer-readable storage medium storing instructions that when executed by a computer cause the computer to perform a method. Device 700 can store instructions 710 for performing (or to perform) a registration process for monitoring a respective address range. Instructions 710 can include: instructions 712 for receiving a first command from an application to register a first address range in a kernel, the first command including a cookie generated by the application which identifies the command; instructions 714 for registering the first address range in the kernel in response to the first command; instructions 716 for setting the first address range to a status of valid in a monitoring state window in the kernel; and instructions 718 for providing, to the application, read-only access to the monitoring state window.

Device 700 can further store instructions 720 for determining (or to determine), based on a command to re-use the first address range, whether to bypass the registration process for the first address range. Device 700 can also store instructions 722 for, responsive to the first address range being valid in the monitoring state window, bypassing (or to bypass) the registration process for the first address range.

Device 700 may include more instructions than those shown in FIG. 7. For example, device 700 can also store instructions for executing the operations described above in relation to: the communications in FIG. 1; the operations depicted in the flowcharts of FIGS. 3, 4A, 4B, 4C, and 5; and the instructions of content-processing system 618 in FIG. 6.

Aspects and Variations of the Instant Application

In general, the disclosed aspects provide a method, computer system, and non-transitory computer-readable storage medium for facilitating a kernel memory monitor which provides mapping change notifications for a user-space. In one aspect, the system performs a registration process for monitoring a respective address range. Performing the registration process comprises: receiving, from an application, a first command to monitor a first address range in a kernel; registering, in the kernel, the first address range; creating a monitoring state window in the kernel, the monitoring state window indicating that the first address range is valid; and providing, to the application, read-only access to the monitoring state window. The system detects, in the kernel based on a previous state of a mapping of virtual addresses to physical addresses, a change associated with a memory mapping of a second address range. The system updates the monitoring state window by invalidating address ranges overlapping with the second address range. Responsive to the first address range being valid, the system bypasses the registration process for the first address range.

In a variation on this aspect, the first command includes a cookie generated by the application as an identifier for the command. The registration process further comprises: storing, in an entry in a first data structure of the kernel, the first address range, an index of an element in a second data structure of the kernel, and the cookie; allocating the element in the second data structure, the element comprising a unique number generated for the element and a status set to a valid state; returning the index and the unique number to a cache in a user-space; and storing the index and the unique number in a cache entry for the first address range.

In a further variation on this aspect, the system updates the monitoring state window by determining the address ranges overlapping with the second address range by searching the first data structure.

In a further variation, the system determines, based on the index and the unique number in the cache entry, whether to bypass or perform the registration process for the first address range. The system obtains an element corresponding to the index by searching the second data structure based on the index and the unique number in the cache entry for the first address range. The system performs a comparison of the unique number in the cache entry with a unique number in the obtained element. The system determines, based on the comparison, that the unique number in the cache entry matches the unique number in the obtained element. In response to a status of the obtained element being set to the valid state, the system determines that the first address range is valid and bypasses the registration process for the first address range. In response to the status of the obtained element being set to an invalid state, the system determines that the first address range is invalid and performs the registration process for the first address range.

In a further variation, the system receives a second command to perform a deregistration process, the second command including the first address range and a second cookie generated by the application as an identifier for the second command. The system removes, from the first data structure, the entry associated with the first address range responsive to the second cookie matching the cookie in the entry.

In a further variation, responsive to detecting the change: the system identifies, in the first data structure, the address ranges overlapping with the second address range; the system sets, in elements in the second data structure corresponding to the identified address ranges, a respective status to an invalid state; and the system removes, from the first data structure, entries corresponding to the identified address ranges.

In a further variation, the system detects the change by receiving, from a memory management system of the kernel, a notification of the change associated with the memory mapping of the second address range.

In a further variation, subsequent to detecting the change, the system posts, to an event queue, a record of invalidating the address ranges which overlap with the second address range.

In a further variation, the system provides, to the application, read-only access to a status window of the kernel, the status window including statistics relating to at least one of:

a number of active registrations; a number of invalidations processed; or information related to occupancy of an event queue.

In another aspect, a computer system comprises a processor and a storage device storing instructions that when executed by the processor cause the processor to perform a method. The method can include performing a registration process for monitoring a respective address range, by: registering, in a registration database of the kernel, the first address range in response to a request from an application; and indicating that the first address range is valid in a monitoring state window which is a read-only data structure for the application. The method can also include: determining, based on a command to re-use the first address range, whether to bypass the registration process for the first address range; and bypassing the registration process for the first address range in response to the first address range being valid in the monitoring state window. The method can further include: receiving a notification of a change in a virtual-to-physical memory mapping associated with a second address range; and invalidating, in the monitoring state window, address ranges overlapping with the second address range. The method can also include the operations described herein, including in relation to: the communications in FIG. 1; the operations depicted in the flowcharts of FIGS. 3, 4A, 4B, 4C, and 5; and the instructions of content-processing system 618 in FIG. 6.

In yet another aspect, a non-transitory computer-readable storage medium stores instructions that when executed by a computer cause the computer to perform a method. The method can include performing a registration process for monitoring a respective address range, the registration process comprising: receiving a first command from an application to register a first address range in a kernel, the first command including a cookie generated by the application which identifies the command; registering the first address range in the kernel in response to the first command; setting the first address range to a status of valid in a monitoring state window in the kernel; and providing, to the application, read-only access to the monitoring state window. The method can also include: determining, based on a command to re-use the first address range, whether to bypass the registration process for the first address range; and responsive to the first address range being valid in the monitoring state window, bypassing the registration process for the first address range. The method performed by the computer based on the instructions stored in the computer-readable storage medium can also include the operations described herein, including in relation to: the communications in FIG. 1; the operations depicted in the flowcharts of FIGS. 3, 4A, 4B, 4C, and 5; the instructions of computer-readable medium/device 700 of FIG. 7.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:
1. A method, comprising:
performing a registration process for monitoring a respective address range, wherein the registration process comprises:
  receiving, from an application, a first command to monitor a first address range in a kernel;
  registering, in the kernel, the first address range;
  creating a monitoring state window in the kernel, the monitoring state window indicating that the first address range is valid; and
  providing, to the application, read-only access to the monitoring state window;
detecting, in the kernel based on a previous state of a mapping of virtual addresses to physical addresses, a change associated with a memory mapping of a second address range;
updating the monitoring state window by invalidating address ranges overlapping with the second address range; and
responsive to the first address range being valid, bypassing a subsequent registration process for the first address range;
wherein the registration process further comprises:
  the first command including a cookie generated by the application as an identifier for the command;
  storing, in an entry in a first data structure of the kernel, the first address range, an index of an element in a second data structure of the kernel, and the cookie;
  allocating the element in the second data structure, the element comprising a unique number generated for the element and a status set to a valid state;
  returning the index and the unique number to a cache in a user-space; and
  storing the index and the unique number in a cache entry for the first address range.
2. The method of claim 1,
wherein updating the monitoring state window comprises determining the address ranges overlapping with the second address range by searching the first data structure.
3. The method of claim 1, further comprising:
determining, based on the index and the unique number in the cache entry, whether to bypass or perform the subsequent registration process for the first address range;
obtaining an element corresponding to the index by searching the second data structure based on the index and the unique number in the cache entry for the first address range;
performing a comparison of the unique number in the cache entry with a unique number in the obtained element;
determining, based on the comparison, that the unique number in the cache entry matches the unique number in the obtained element;
in response to a status of the obtained element being set to the valid state, determining that the first address range is valid and bypassing the subsequent registration process for the first address range; and in response to the status of the obtained element being set to an invalid state, determining that the first address range is invalid and performing the registration process for the first address range.

4. The method of claim 1, further comprising:
receiving a second command to perform a deregistration process, the second command including the first address range and a second cookie generated by the application as an identifier for the second command; and
removing, from the first data structure, the entry associated with the first address range responsive to the second cookie matching the cookie in the entry.

5. The method of claim 1, wherein responsive to detecting the change, the method further comprises:
identifying, in the first data structure, the address ranges overlapping with the second address range;
setting, in elements in the second data structure corresponding to the identified address ranges, a respective status to an invalid state; and
removing, from the first data structure, entries corresponding to the identified address ranges.

6. The method of claim 1, wherein detecting the change comprises:
receiving, from a memory management system of the kernel, a notification of the change associated with the memory mapping of the second address range.

7. The method of claim 1, wherein subsequent to detecting the change, the method further comprises:
posting, to an event queue, a record of invalidating the address ranges which overlap with the second address range.

8. The method of claim 1, further comprising:
providing, to the application, read-only access to a status window of the kernel, the status window including statistics relating to at least one of:
a number of active registrations;
a number of invalidations processed; or
information related to occupancy of an event queue.

9. A computer system, comprising:
a processor; and
a storage device storing instructions to:
perform a registration process for monitoring a respective address range, wherein the registration process comprises:
registering, in a registration database of the kernel, the first address range in response to a request from an application; and
indicating that the first address range is valid in a monitoring state window which is a read-only data structure for the application;
determine, based on a command to re-use the first address range, whether to bypass a subsequent registration process for the first address range;
bypass the subsequent registration process for the first address range in response to the first address range being valid in the monitoring state window;
receive a notification of a change in a virtual-to-physical memory mapping associated with a second address range; and
invalidate, in the monitoring state window, address ranges overlapping with the second address range;
wherein the registration process further comprises:
receiving, from the application, a first command to monitor the first address range in a kernel, the first command including a cookie generated by the application as an identifier for the command;
storing, in an entry in a first data structure of the kernel, the first address range, an index of an element in a second data structure of the kernel, and the cookie;
allocating the element in the second data structure, the element comprising a unique number generated for the element and a status set to a valid state;
returning the index and the unique number to a cache in a user-space; and
storing the index and the unique number in a cache entry for the first address range.

10. The computer system of claim 9, the instructions further to, prior to invalidating the address ranges overlapping with the second address range:
identify the address ranges overlapping with the second address range by searching the first data structure.

11. The computer system of claim 9, determining whether to bypass the subsequent registration process for the first address range comprising:
determining, based on the index and the unique number in the cache entry, whether to bypass or perform the subsequent registration process for the first address range;
obtaining an element corresponding to the index by searching the second data structure based on the index and the unique number in the cache entry for the first address range;
determining that the unique number in the cache entry matches the unique number in the obtained element;
in response to a status of the obtained element being set to the valid state, determining that the first address range is valid and bypassing the subsequent registration process for the first address range; and
in response to the status of the obtained element being set to an invalid state, determining that the first address range is invalid and performing the subsequent registration process for the first address range.

12. The computer system of claim 9, the instructions further to:
receive a second command to perform a deregistration process, the second command including the first address range and a second cookie generated by the application as an identifier for the second command; and
in response to the second cookie matching the cookie in the entry, remove the entry associated with the first address range from the first data structure.

13. The computer system of claim 9, the instructions further to, responsive to receiving the notification of the change:
identify, in the first data structure, the address ranges overlapping with the second address range;
set, in elements in the second data structure corresponding to the identified address ranges, a respective status to an invalid state; and
remove, from the first data structure, entries corresponding to the identified address ranges.

14. The computer system of claim 9, the instructions further to, subsequent to receiving the notification of the change:
post, to an event queue, an event indicating setting to the invalid state the respective status in the elements in the second data structure corresponding to the identified address ranges.

15. The computer system of claim 9, the instructions further to:

display, on a screen of a device associated with the application, a status window which includes statistics relating to at least one of:
a number of active registrations;
a number of invalidations processed; or
information related to occupancy of an event queue.

16. A non-transitory computer-readable storage medium storing instructions to:
perform a registration process for monitoring a respective address range, the registration process comprising:
receiving a first command from an application to register a first address range in a kernel, the first command including a cookie generated by the application which identifies the command;
registering the first address range in the kernel in response to the first command;
setting the first address range to a status of valid in a monitoring state window in the kernel; and
providing, to the application, read-only access to the monitoring state window;
determine, based on a command to re-use the first address range, whether to bypass a subsequent registration process for the first address range; and
responsive to the first address range being valid in the monitoring state window, bypass the subsequent registration process for the first address range;
the registration process further comprising:
generating a unique number corresponding to the first address range;
storing the unique number in an element for the first address range in the monitoring state window;
returning the unique number to a cache in a user-space; and
wherein determining whether to bypass the subsequent registration process for the first address range is based on:
the unique number in the cache;
the unique number stored in the element in the monitoring state window; and
the status of the element in the monitoring window.

17. The non-transitory computer-readable storage medium of claim 16, the instructions further to:
detect, in the kernel, a change associated with a memory mapping of a second address range based on a notification message from a memory management subsystem of the kernel;
identify, in the registration database, entries corresponding to address ranges which overlap with the second address range;
delete, from the registration database, the identified entries; and
invalidate, in the monitoring state window, elements with address ranges overlapping with the second address range by invalidating the respective status of a respective element.

* * * * *